US012671086B2

(12) United States Patent
Kim et al.

(10) Patent No.: US 12,671,086 B2
(45) Date of Patent: Jun. 30, 2026

(54) CATHODE ACTIVE MATERIAL FOR LITHIUM SECONDARY BATTERY, AND LITHIUM SECONDARY BATTERY INCLUDING SAME

(71) Applicant: The Industry & Academic Cooperation in Chungnam National University (IAC), Daejeon (KR)

(72) Inventors: Chun Joong Kim, Daejeon (KR); Hyung Kwon Jeon, Daejeon (KR)

(73) Assignee: The Industry & Academic Cooperation in Chungnam National University (IAC), Daejeon (KR)

( * ) Notice: Subject to any disclaimer, the term of this patent is extended or adjusted under 35 U.S.C. 154(b) by 572 days.

(21) Appl. No.: 18/182,554

(22) Filed: Mar. 13, 2023

(65) Prior Publication Data

US 2024/0006602 A1 Jan. 4, 2024

(30) Foreign Application Priority Data

Jul. 4, 2022 (KR) ......................... 10-2022-0082087

(51) Int. Cl.
*H01B 1/08* (2006.01)
*H01M 4/131* (2010.01)
(Continued)

(52) U.S. Cl.
CPC .............. *H01M 4/505* (2013.01); *H01B 1/08* (2013.01); *H01M 4/131* (2013.01); *H01M 4/525* (2013.01);
(Continued)

(58) Field of Classification Search
CPC ........... H01B 1/00; H01B 1/08; H01M 4/131; H01M 4/505; H01M 4/525
See application file for complete search history.

(56) References Cited

U.S. PATENT DOCUMENTS 9,871,250 B2 * 1/2018 Kim ...................... H01M 4/582
9,923,198 B2 * 3/2018 Kim ...................... H01M 4/505
(Continued)

FOREIGN PATENT DOCUMENTS

KR 10-2012-0129926 A 11/2012
KR 10-1583125 B1 1/2016
(Continued)

OTHER PUBLICATIONS

Prasad et al "Dopant-induced stabilization of rhombohedral LiMnO2 against Jahn-Teller distortion", Physical Review B 71, 134111 (2005).*
(Continued)

*Primary Examiner* — Mark Kopec
(74) *Attorney, Agent, or Firm* — Sughrue Mion, PLLC

(57) ABSTRACT

Proposed are a lithium secondary battery cathode active material doped with B and Sn and a lithium secondary battery including the cathode active material. The B and Sn doping enables a cathode capable of solving problems occurring in a high-nickel cathode, such as (1) an electrolyte side reaction on the surface, 2) a crystal structure collapse, 3) oxygen release, 4) inert $Ni^{4+}$ generation; 5) cation mixing, and 6) transition metal elution. This improves the life span of a lithium secondary battery.

10 Claims, 13 Drawing Sheets

(51) Int. Cl.

| | |
|---|---|
| *H01M 4/505* | (2010.01) |
| *H01M 4/525* | (2010.01) |
| *H01M 10/052* | (2010.01) |
| *H01M 4/02* | (2006.01) |

(52) U.S. Cl.
CPC .... *H01M 10/052* (2013.01); *H01M 2004/028* (2013.01)

(56) References Cited

U.S. PATENT DOCUMENTS

| | | | | |
|---|---|---|---|---|
| 10,797,318 | B2 * | 10/2020 | Sun | H01M 4/366 |
| 2016/0218359 | A1 * | 7/2016 | Kim | C01G 53/50 |
| 2022/0181675 | A1 | 6/2022 | Dou et al. | |
| 2023/0144644 | A1 * | 5/2023 | Kim | C01G 51/42 |
| | | | | 429/231.95 |

FOREIGN PATENT DOCUMENTS

| | | | |
|---|---|---|---|
| KR | 10-2020-0096549 | A | 8/2020 |
| KR | 10-2327052 | B1 | 11/2021 |
| WO | 2014/126061 | A1 | 8/2014 |

OTHER PUBLICATIONS

Eilers-Rethwisch et al "Comparative study of Sn-doped Li[Ni0.6Mn0.2Co0.2-xSnx]O2 cathode active materials (x=0-0.5) for lithium ion batteries regarding electrochemical performance and structural stability", Journal of Power Sources 397 (2018) 68-78.*

Dianat et al "Effects of Al-doping on the properties of Li—Mn—Ni—O cathode materials for Li-ion batteries: an ab initio study", J. Mater. Chem. A, 2013, 1, 9273.*

Feng et al "A Three in One Strategy to Achieve Zirconium Doping, Boron Doping, and Interfacial Coating for Stable LiNi0.8Co0.1Mn0.1O2 Cathode", Adv. Sci. 2021, 8, 2001809.*

Park et al "Improved Cycling Stability of Li[Ni0.90Co0.05Mn0.05]O2 Through Microstructure Modification by Boron Doping for Li-Ion Batteries", Adv. Energy Mater. 2018, 8, 1801202.*

Li et al."W/Mg dual-site doping triggering high Ni migration barrier and rock-salt passivation layer for long-cycle and thermal stable ultrahigh-nickel cathode material LiNi0.9Co0.1O2", Journal of Power Sources 635 (2025) 236506.*

Korean Office Action dated Dec. 11, 2024 in Application No. 10-2022-0082087.

Kang-Joon Park, et al.,"Improved Cycling Stability of Li[$Ni_{0.90}Co_{0.05}Mn_{0.05}$]$O_2$ Through Microstructure Modification by Boron Doping for Li-Ion Batteries", Advanced Energy Materials, 2018, vol. 8, pp. 1-9 (9 pages).

Yun Liu, et al.,"Understanding the enhancement effect of boron doping on the electrochemical performance of single-crystalline Ni-rich cathode materials", Journal of Colloid and Interface Science, vol. 604, 2021, pp. 776-784 (9 pages).

Matthias Eilers-Rethwisch, et al.,"Synthesis, electrochemical investigation and structural analysis of doped Li [$Ni_{0.6}Mn_{0.2}Co_{0.2-\chi}M_\chi$]$O_2$ ($\chi$=0, 0.05; M=Al, Fe, Sn) cathode materials", Journal of Power Sources, 2018, pp. 101-107 (7 pages).

Tina Weigel Florian Schipper et al., "Structural and Electrochemical Aspects of LiNi0.8Co0.1Mn0.1O2 Cathode Materials Doped by Various Cations", ACS Energy Letters, Apr. 2, 2019, pp. 2.

* cited by examiner

【FIG. 1】
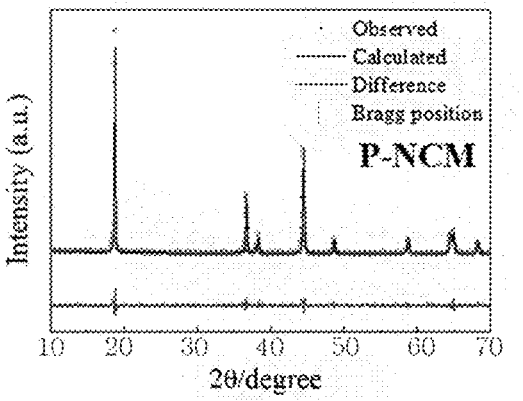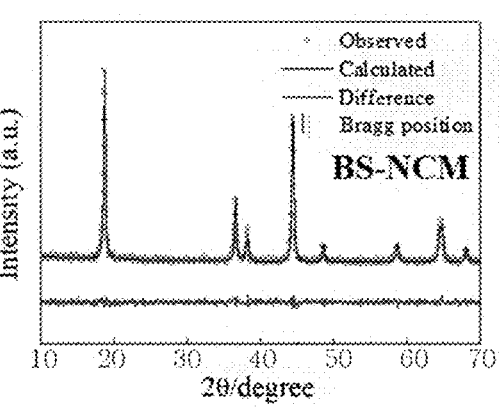
【FIG. 2】
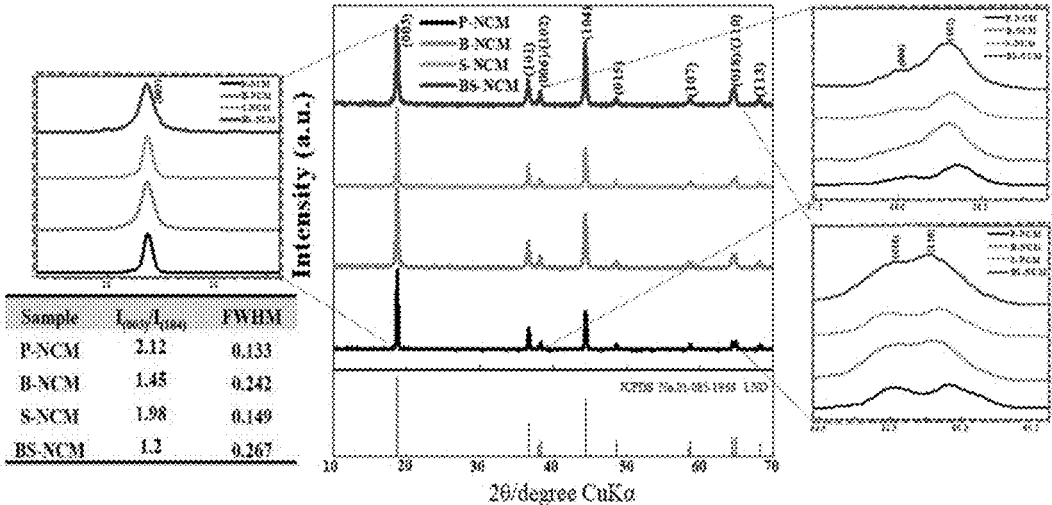

【FIG. 3】
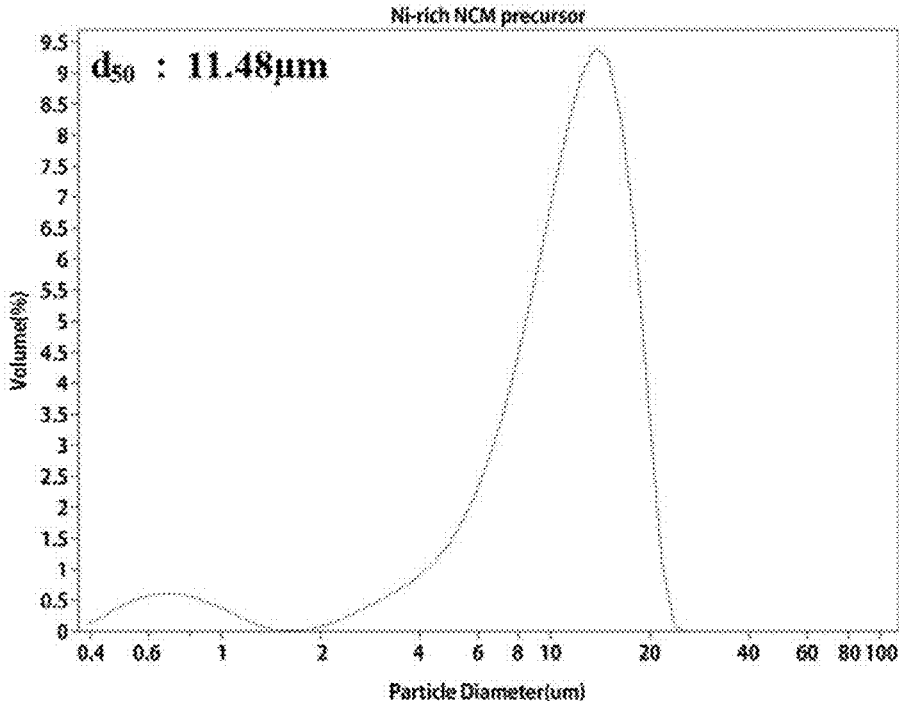

【FIG. 4】
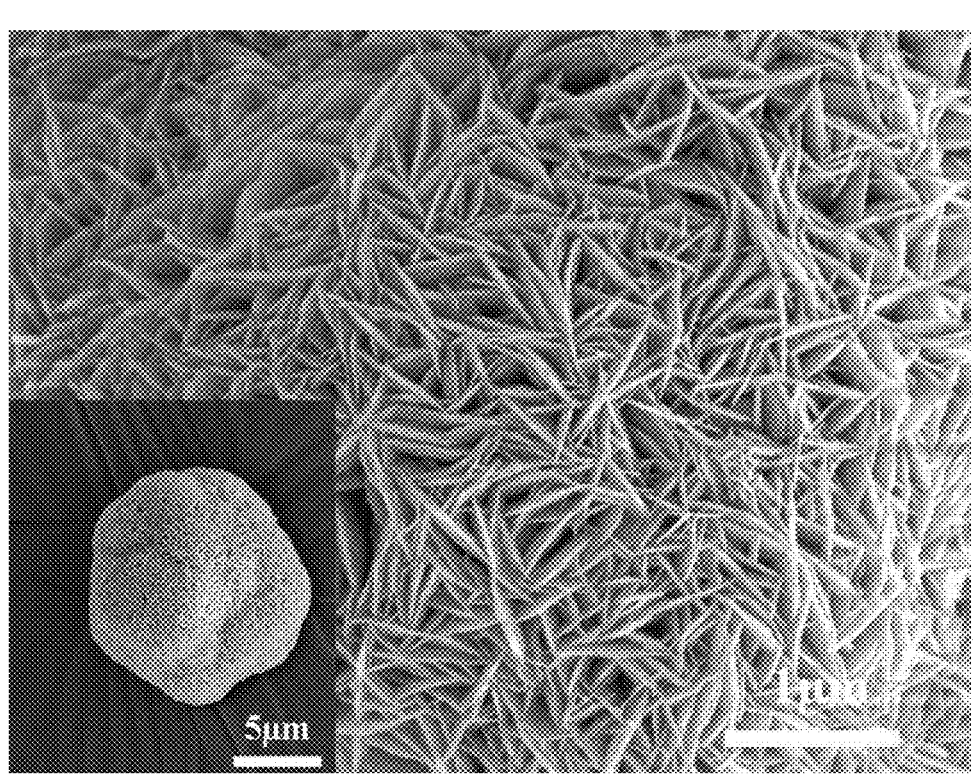

【FIG. 5】
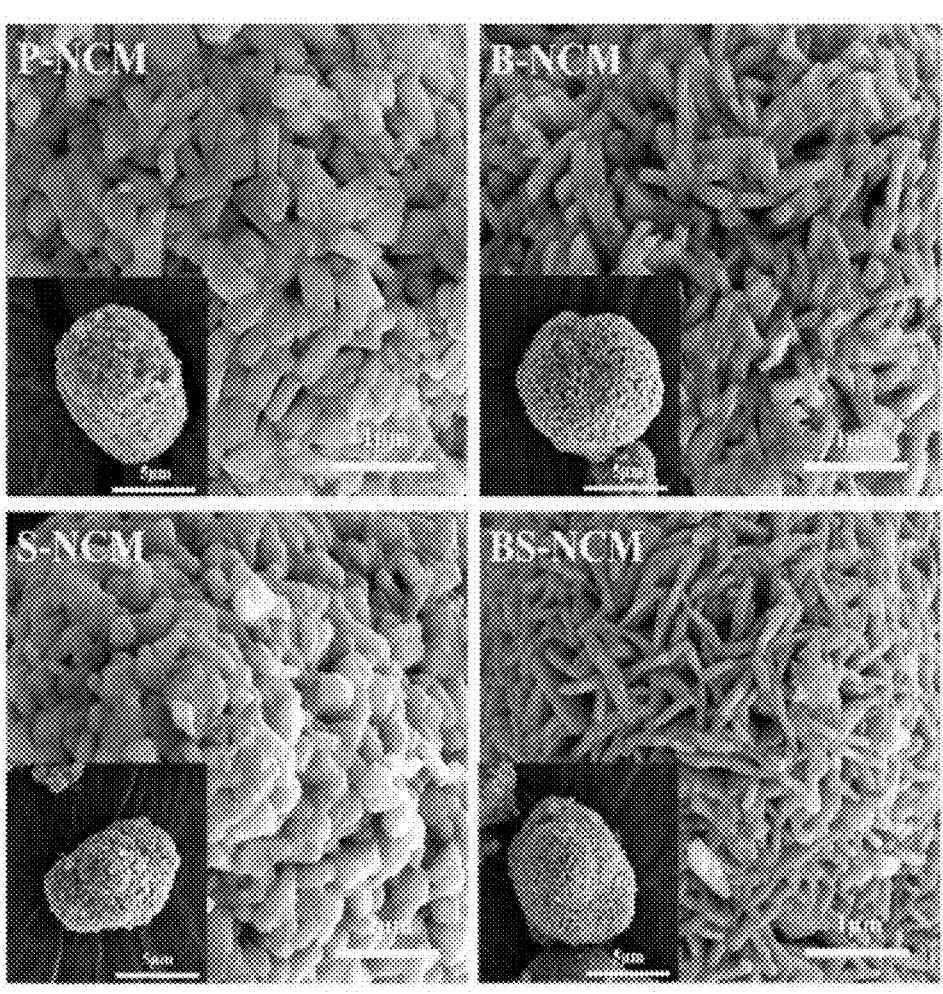

【FIG. 6】
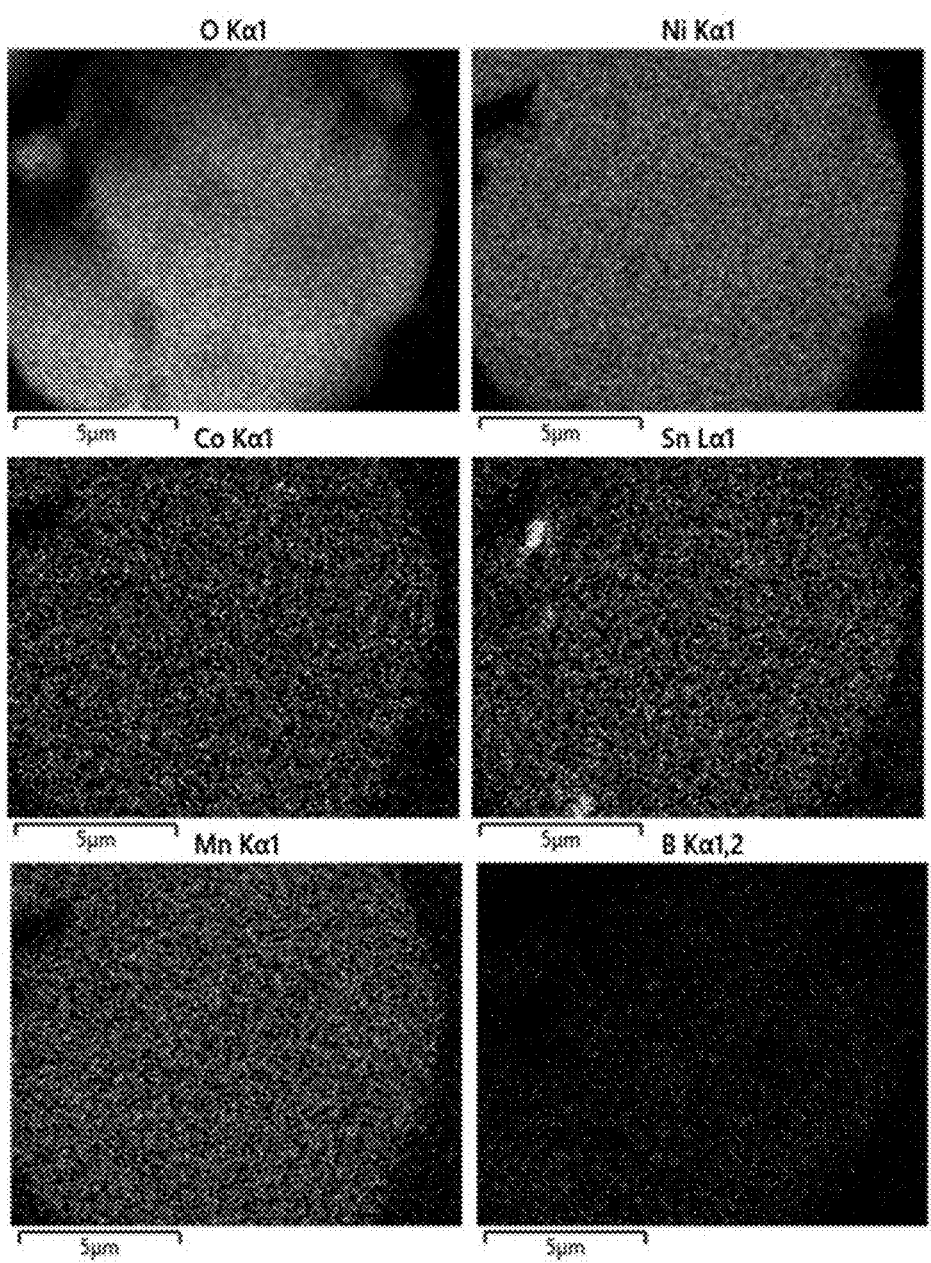

【FIG. 7】
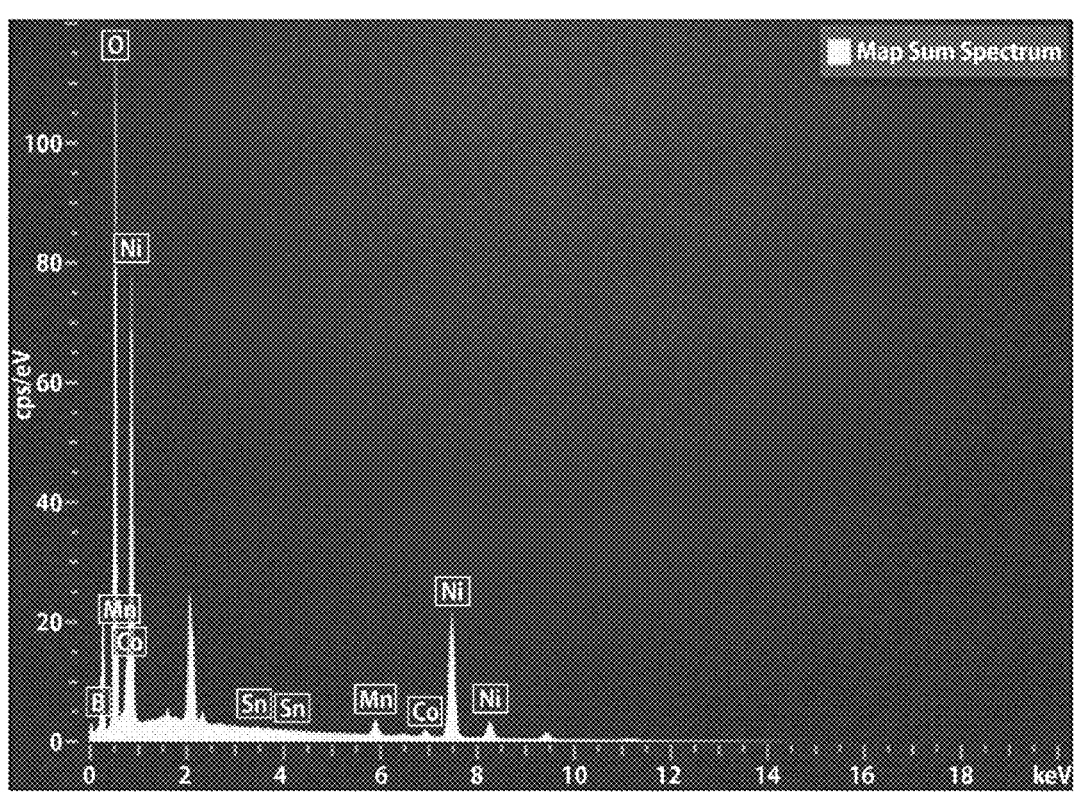

【FIG. 8】
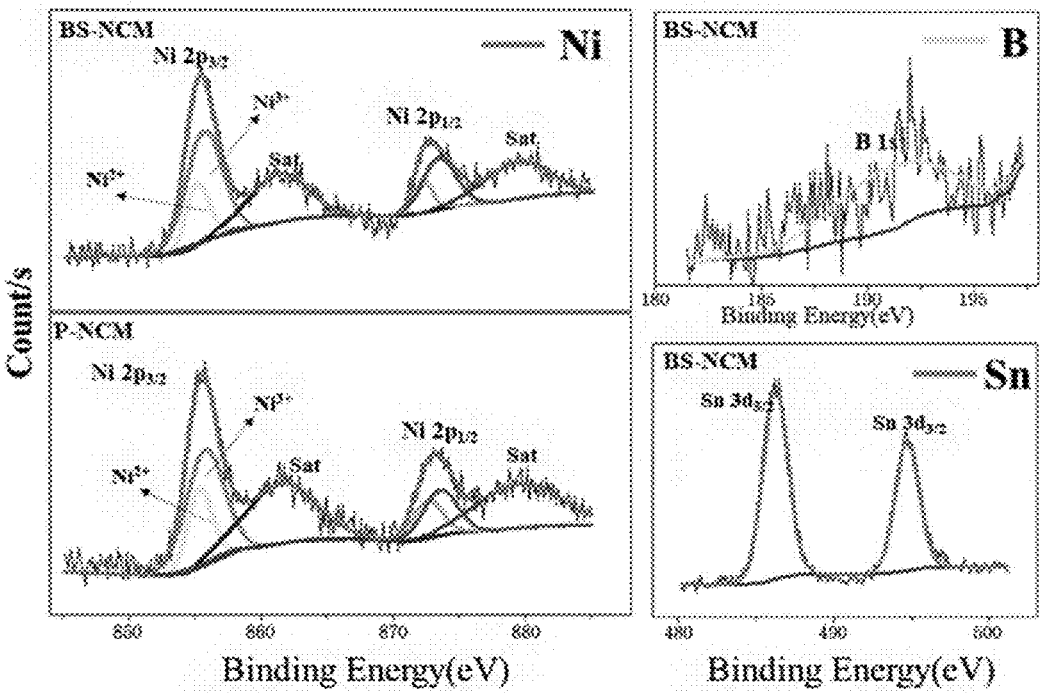
【FIG. 9】
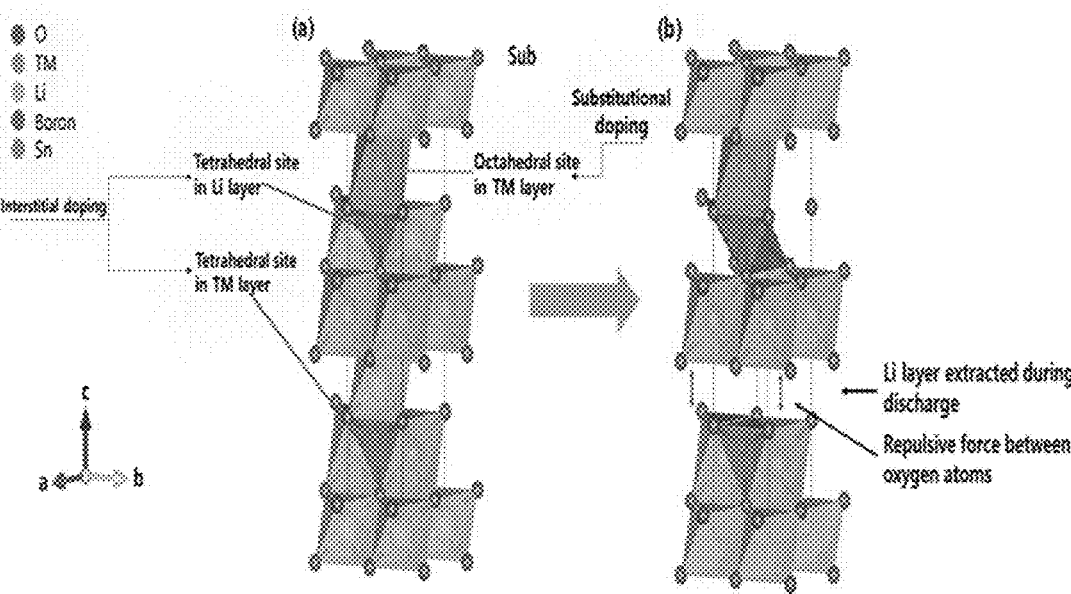

【FIG. 10】
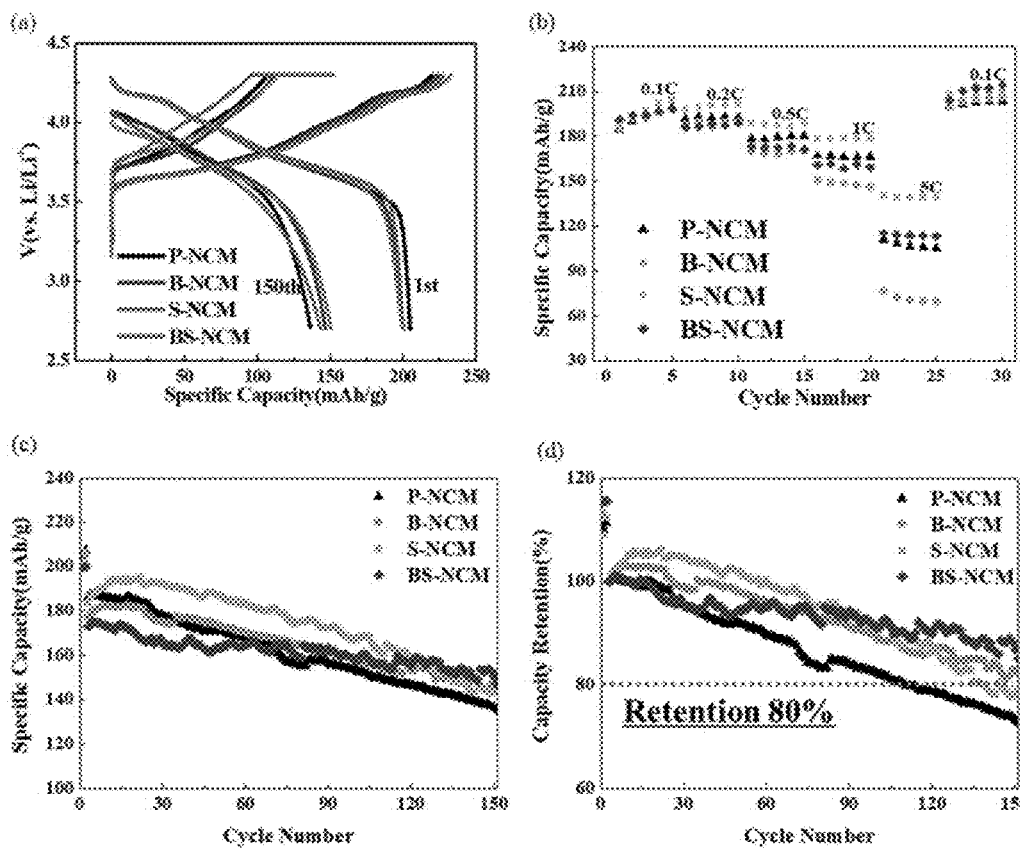

【FIG. 11】
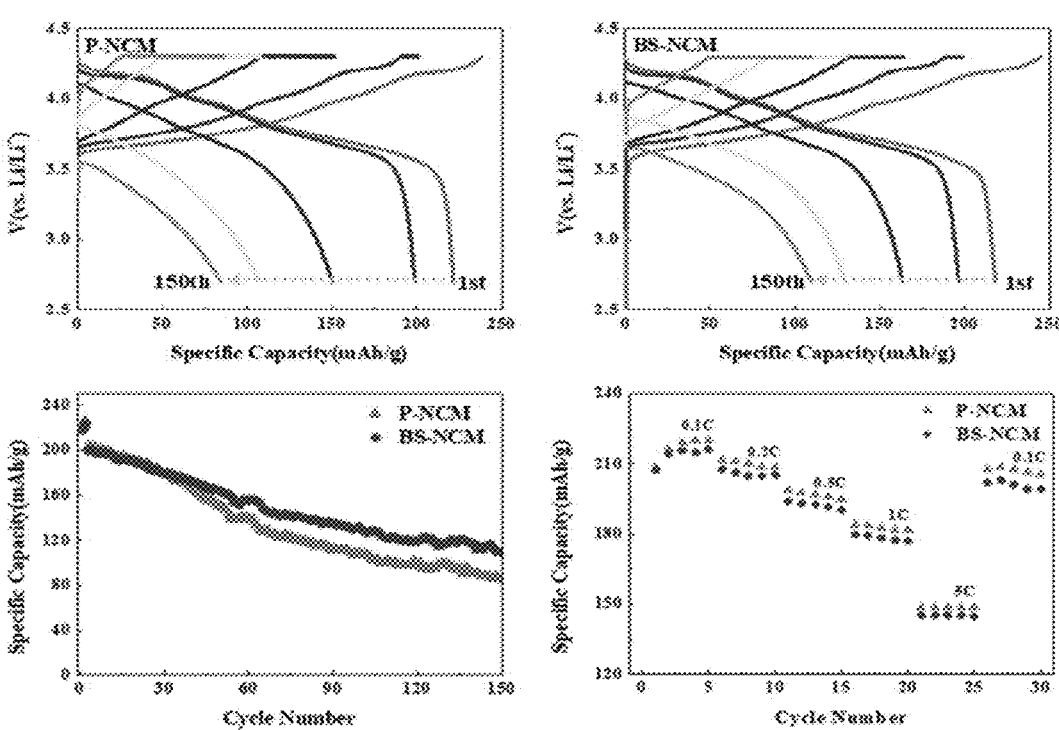

【FIG. 12】
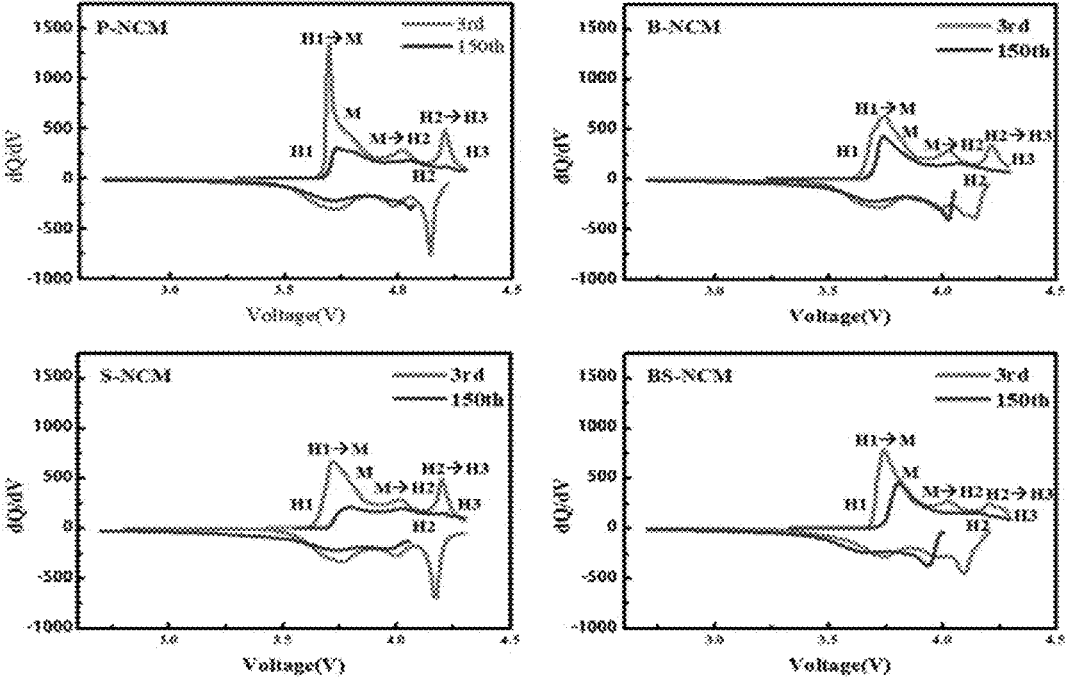
【FIG. 13】
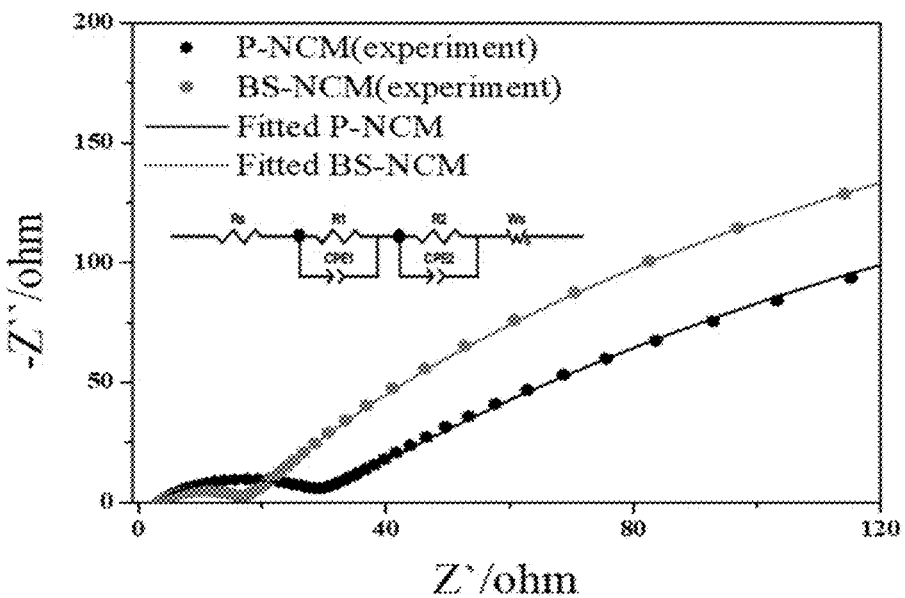

【FIG. 14】
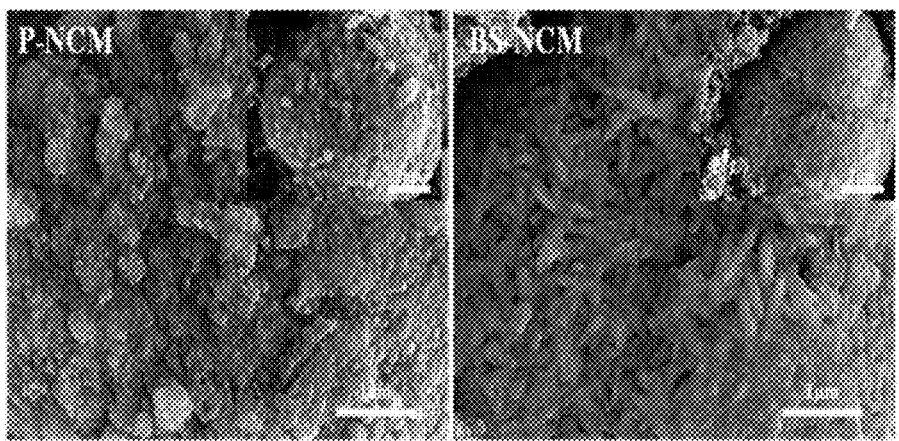
【FIG. 15】
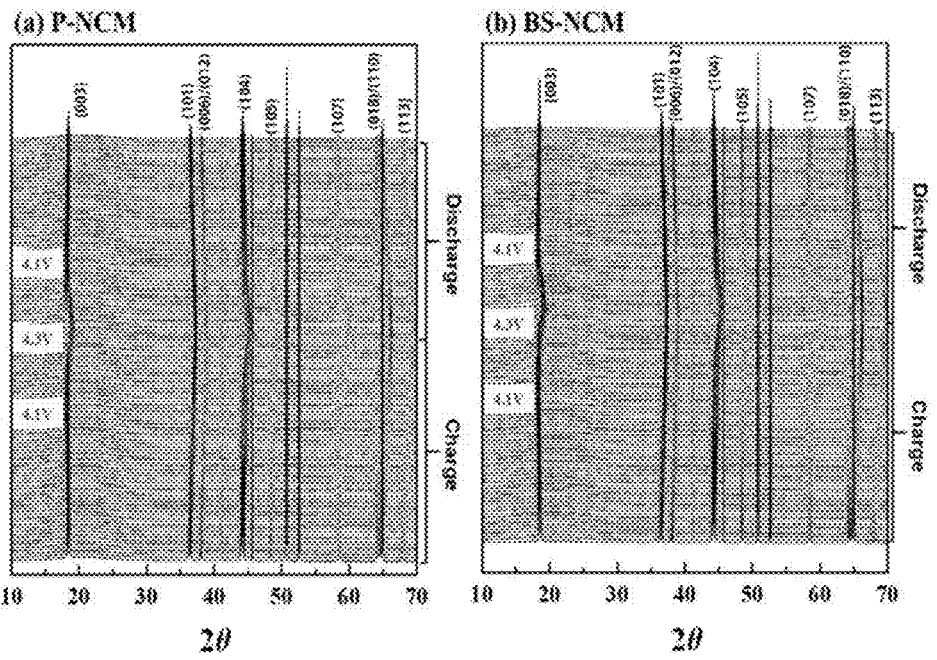

【FIG. 16】
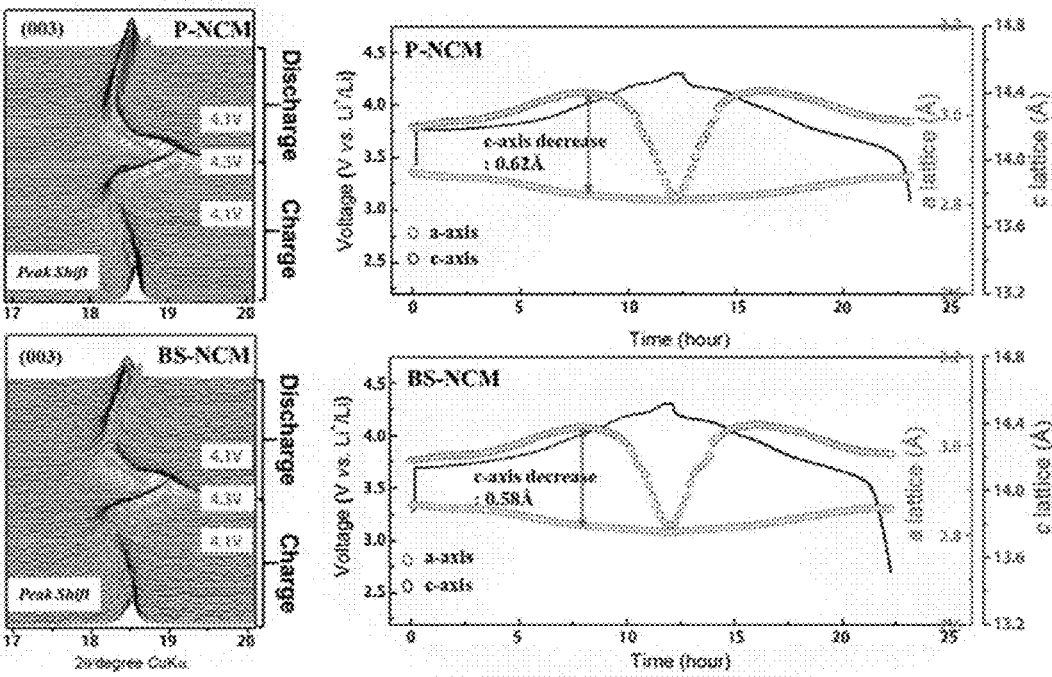
【FIG. 17】
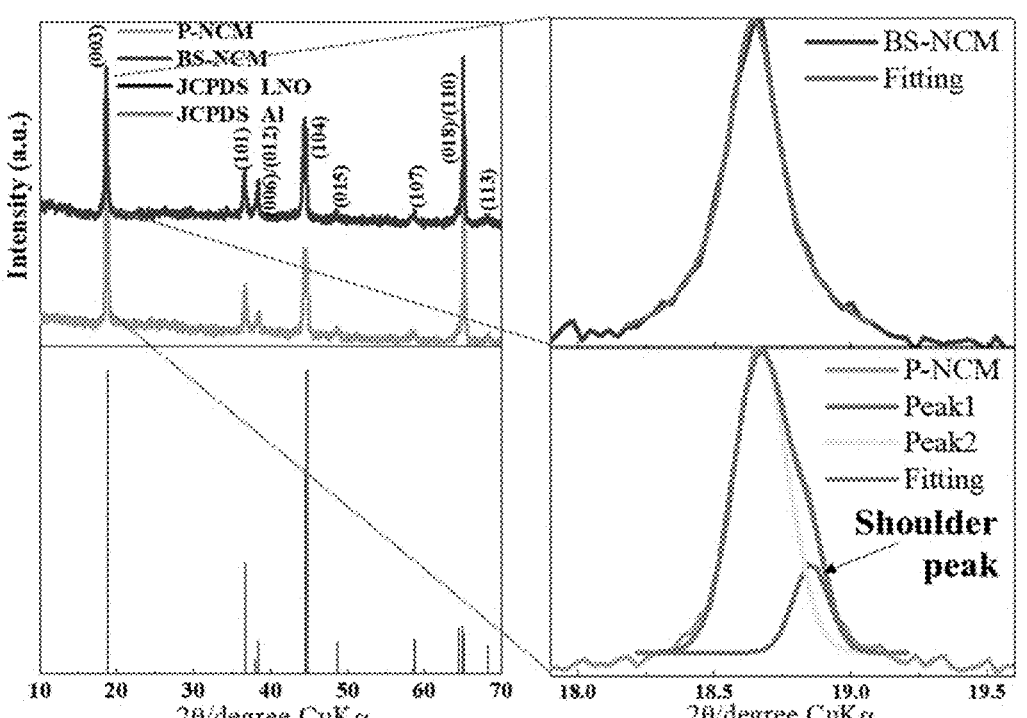

【FIG. 18】
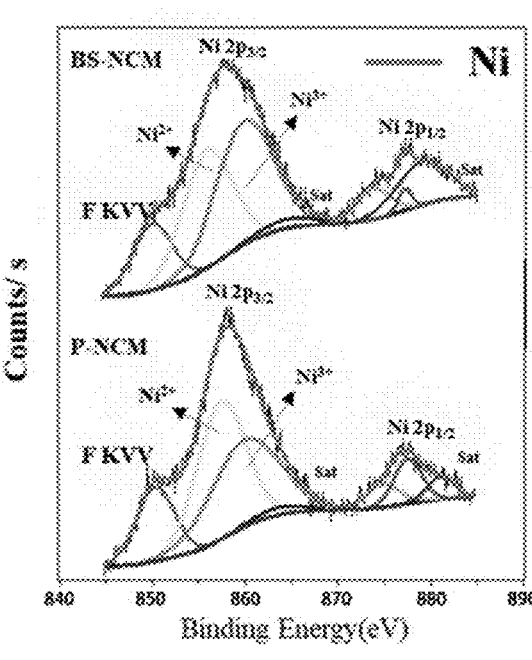
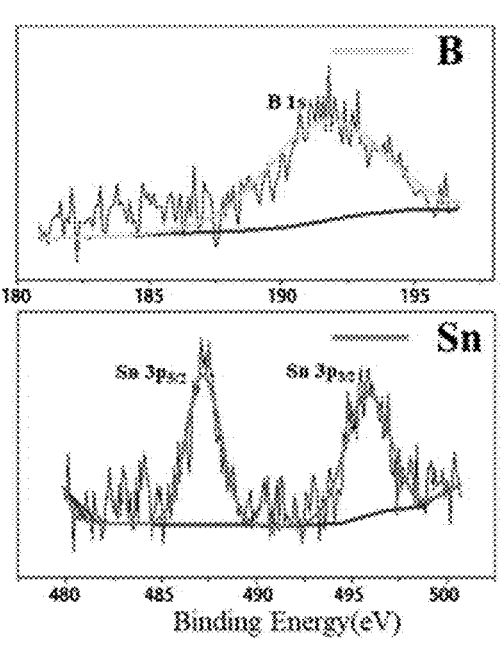

CATHODE ACTIVE MATERIAL FOR LITHIUM SECONDARY BATTERY, AND LITHIUM SECONDARY BATTERY INCLUDING SAME

CROSS REFERENCE TO RELATED APPLICATION

The present application claims priority to Korean Patent Application No. 10-2022-0082087, Jul. 4, 2022, the entire contents of which is incorporated herein for all purposes by this reference.

BACKGROUND OF THE DISCLOSURE

1. Field of the Disclosure The present disclosure relates to a cathode active material doped with B and Sn for a lithium secondary battery and to a lithium secondary battery including the same.

2. Description of the Related Art

Li $(Ni_xCo_yMn_{1-x-y})O_2$, referred to as an NCM-based cathode active material, is one of the most popular cathode materials due to its high energy density. In particular, it is mainly used in electric vehicles where energy density is very important. Research on cathodes is focused on a material having a content of 80% or more of Ni and a reduced content of Co to increase mileage performance and price competitiveness.

Ni-rich NCM, which refers to an NCM-based cathode active material having a high Ni content, has a very high energy density. However, there is a problem that the battery capacity decreases rapidly as the number cycles of charging and discharging increases. It is regarded that the causes of the problem include crystal structure collapse, oxygen release, inert $Ni^{4+}$ generation, transition metal elution, cationic mixing, and side reactions with an electrolyte on the surface of an active material. Due to the phase change in the vicinity of 4.2V that occurs only in Ni-rich NCM batteries, a sharp decrease of the c-axis dimension of the crystal structure occurs, resulting in an anisotropic lattice stress to the active material, resulting in oxygen release, particle destruction, and microcracks in the material. As a result, the material cannot function as an active material, resulting in a capacity decrease.

To solve this problem, the measures of coating or chemically the surface of a cathode have been made. When a coating layer is formed on the surface of the cathode to prevent side reactions between NCM particles and electrolyte, a direct contact between the NCM particles and the electrolyte can be avoided. The coating layer is made of a metal oxide such as $Al_2O_3$ and ZnO, a phosphate such as $FePO_4$, and $Ni(PO_4)_2$, a lithium ion conductor such as $Li_2TiO_3$ and $Li_2SiO_3$, or a fluorinated metal such as $AlF_3$, and LiF.

The chemical doping, on the other hand, improves capacity retention by stabilizing the crystal structure. Mainly used additives include $B^{3+}$, $Al^{3+}$, $Mg^{2+}$, $Ti^{4+}$, and $Sn^{4+}$, which serve to maintain the crystal structure as an inert element during charging and discharging.

Many reports show that recent doping of boron has successfully improved the capacity retention of Ni-rich NCM. The technique uses the principle of maintaining the stable crystal structure during charging and discharging, based on strong bonding energy with oxygen. In addition, in the case of boron doping, the shape of the NCM primary particles is changed. This activates {010} plane, thereby facilitating the diffusion of lithium ions.

Tin doping has recently been used in Ni-rich NCM and is undergoing various studies. Tin ions, which are high-valent cations, strongly pull the electrons of oxygen when combined with oxygen. When lithium ions excessively exit from the Ni-rich NCM, an unstable structure is formed. However, tin ions strongly bind to oxygen, thereby maintaining a stable crystal structure.

The present disclosure provides a method of solving the problems of conventional Ni-rich NCM by doping a heteroatom, and a method of stabilizing a cathode active material by doping two heteroatoms at the same time.

LITERATURE OF RELATED ART

Patent Literature (Patent Literature 1) (0001) Korean Patent Application Publication No. 10-2020-0096549 (Nov. 20, 2018)

(Patent Literature 2) (0002) Korean Patent No. 10-1583125 (Jan. 6, 2014)

(Patent Literature 3) (0003) Korean Patent No. 10-2327052 (Nov. 29, 2019)

(Patent Document 4) (0004) U.S. Patent Application Publication No. 2022-0181675 (June 9, 2022)

Non-Patent Literature (Non-patent Literature 1) (0001) T. Weigel, F. E. Schipper, M. Erickson, F. A. Susai, B. Markovsky, and D. Aurbach, Structural and Electrochemical Aspects of LiNi0.8Co0.1Mn0.1O2 Cathode Materials Doped by Various Cations, ACS Energy Letters, 2019, 4, 2, 508-516.

SUMMARY OF THE DISCLOSURE

To solve the above problems, an objective of the present disclosure is to provide a lithium secondary battery cathode active material doped with boron (B) and tin (Sn) and a lithium secondary battery including the same material.

In order to accomplish the above objective, the present disclosure provides a lithium secondary battery cathode active material and a lithium secondary battery including the cathode active material.

The lithium secondary battery cathode active material has a nickel content in a range of 10% to 24% by mole, contains cobalt and manganese, and is doped with a heteroatom.

The crystal lattice of the cathode active material used for a lithium secondary battery may have a rhombohedral structure in which a lithium layer and a transition metal layer are alternately stacked.

The heteroatom may be any one or both of B and Sn. The heteroatom may be derived from a dopant used in a method of manufacturing a cathode active material for a lithium secondary battery. In this case, the molar ratio of the lithium to the heteroatom in the cathode active material for a lithium secondary battery is in a range of from 1:0.01 to 0.10.

The cathode active material for a lithium secondary battery has a lattice parameter of 2.8700<a<2.8800 and 14.1800<c<14.1900. In this case, the c/a ratio, which is a lattice parameter ratio, of the cathode active material for a lithium secondary battery is in a range of 4.930 to 4.940.

The implant heteroatoms are introduced into tetrahedral sites in the lithium layer or the transition metal layer of the rhombohedral structure. The heteroatoms are introduced into octahedral sites where a transition metal exists, thereby replacing the transition metal.

The cathode active material for a lithium secondary battery is characterized in that the heteroatom is positioned at 3b or 6c of Wyckoff positions.

A method of preparing a cathode active material for a lithium secondary battery includes: synthesizing a metal oxide precursor; preparing a mixture composed of the precursor, a dopant, and lithium hydroxide; and heat-treating the mixture and then grinding the mixture uniformly.

The metal oxide precursor is made from a transition metal solution. The transition metal solution contains one or more substrates selected from among a nickel salt, a cobalt salt, and a manganese salt. In this case, the anion of the salt is a commonly used anion, for example, $SO_4^{2-}$, $Cl^-$, and $NO^{3-}$.

The transition metal solution is composed of a salt of a transition metal that is to be included in the chemical composition of the lithium secondary battery cathode active material to be prepared.

The molar concentration of the transition metal solution for preparing the metal oxide precursor is in a range of 1.0 M to 5.0 M. The metal oxide precursor is prepared by preparing the transition metal solution then causing co-precipitation by adding an aqueous NaOH solution and ammonia water.

The dopant may include one or a mixture of both selected from among a first dopant and a second dopant, in which the first dopant is a material including B, and the second dopant is a material including Sn.

In addition, the present disclosure provides a lithium secondary battery cathode including the lithium secondary battery cathode active material and provides a lithium secondary battery including the lithium secondary battery cathode.

The lithium secondary battery may have a capacity retention rate of 80% or more calculated according to Equation 1 after 150 cycles of charging and discharging operations.

Capacity retention rate (%) for n cycles of charging and discharging=(capacity for n-th discharging operation/capacity for first discharging operation)×100     [Equation 1]

In the lithium secondary battery including the lithium secondary battery cathode active material according to the present disclosure, heteroatoms introduced as dopants stabilize the crystal structure of the active material, thereby preventing oxygen or a transition metal from escaping during charging and discharging of a cell, thereby preventing cell deterioration caused by charging and discharging. This results in increase in the service life of a battery.

BRIEF DESCRIPTION OF THE DRAWINGS

FIG. 1 is a graph illustrating X-ray diffraction (XRD) patterns of Example 1 and Comparative Example;

FIG. 2 is a graph illustrating XRD patterns of Examples 1 to 3 and Comparative Example;

FIG. 3 is a graph illustrating a particle size distribution of a metal oxide precursor; FIG. 4 is a scanning electron microscope (SEM) image of a metal oxide precursor;

FIG. 5 is an SEM images of Examples 1 to 3 and Comparative Example;

FIG. 6 is a photograph showing an elemental distribution of Example 1 observed by energy dispersive spectroscopy (EDS);

FIG. 7 is a graph showing the elemental distribution of Example 1 observed by EDS;

FIG. 8 is a graph showing X-ray photoelectron spectroscopy (XPS) patterns of Example 1 and Comparative Example;

FIG. 9 is a schematic diagram illustrating the lattice structure of Example 1.

FIG. 10 is a graph showing the performance of a battery according to each of Examples 1 to 3 and Comparative Example;

FIG. 11 is a graph showing the performance of a battery according to each of Example 1 and Comparative Example;

FIG. 12 is a graph of dQ/dV of a battery according to each of Examples 1 to 3 and Comparative Example;

FIG. 13 is a Nyquist plot made by performing an electrochemical impedance spectroscopy (EIS) on a battery manufactured according to Example 1 and Comparative Example;

FIG. 14 is SEM images of electrodes taken from the batteries of Example 1 and Comparative Example after a charging/discharging test;

FIG. 15 is a diagram illustrating XRD patterns of Example 1 and Comparative Example, measured in real time during charging/discharging;

FIG. 16 is a view illustrating both a charging/discharging graph and the movement of real-time XRD peak pattern during charging/discharging of Example 1 and Comparative Example;

FIG. 17 is a view illustrating XRD patterns of electrodes taken from the batteries of Example 1 and Comparative Example after a charging/discharging test; and FIG. 18 is an enlarged view illustrating the peaks of Ni, B, and Sn in the XRD patterns of electrodes taken from the batteries of Example 1 and Comparative Example after a charging/discharging test.

DESCRIPTION OF THE PREFERRED EMBODIMENTS

Hereinafter, a lithium secondary battery cathode active material and a lithium secondary battery according to the present disclosure will be described. The following drawings are provided as examples to sufficiently convey the idea of the present disclosure to those skilled in the art. Accordingly, the present disclosure is not limited to the drawings and may be embodied in other forms, and the drawings presented below may be exaggerated to clarify the spirit of the present disclosure. In the flowing description, unless otherwise defined, all teams including technical and scientific terms used herein have the same meaning as commonly understood by those who are ordinarily skilled in the art to which this disclosure belongs. Further, when it is determined that the detailed description of the known art related to the present disclosure might obscure the gist of the present disclosure, the detailed description thereof will be omitted.

In order to accomplish the above objective, the present disclosure provides a lithium secondary battery cathode active material and a method of preparing the same.

The cathode active material for a lithium secondary battery provided in the present disclosure includes nickel, cobalt, and manganese, and in particular, the content of nickel in the cathode active material is in the range of from 10% to 24% by mole. The content of nickel in the cathode active material is preferably in the range of from 12% to 24% by mole and more preferably in the range of 20% to 23% by mole.

More particularly, when the formula except for a heteroatom in the cathode active material provided by the present disclosure is $Li\ (Ni_xCo_yMn_{1-x-y})O_2$ where $0.40 \leq x \leq 0.96$, $0.01 \leq y \leq 0.30$, and $x+y<1$. Preferably, $0.48 \leq x \leq 0.96$ is satisfied and more preferably $0.80 \leq x \leq 0.96$ is satisfied.

In addition, the cathode active material for a lithium secondary battery according to the present disclosure is doped with a heteroatom.

The heteroatom is any one or both of B and Sn. The heteroatoms originate in a dopant used in a method of preparing a cathode active material for a lithium secondary battery.

Among the heteroatoms, B as a dopant existing in the cathode active material has a strong binding energy with oxygen, thereby preventing the release of oxygen caused by lithium oxidation occurring in the cathode active material a during charging operation.

In addition, Sn among the heteroatoms is particularly effective in a high-nickel cathode active material as in the present disclosure. When $Sn^{4+}$ ions, which are high-valent cations, combine with oxygen, the $Sn^{4+}$ ions strongly pull electrons of oxygen, thereby preventing oxygen from being released.

In addition, the present disclosure provides a cathode active material doped with both of B and Sn. B and Sn, which are dopants, enable the crystal structure in the high-nickel cathode active material to be stably maintained. This weakens the in-crystal anisotropic lattice stress attributable to the phase change, thereby increasing the lifespan of the cathode active material for a lithium secondary battery.

To this effect, the cathode active material for a lithium secondary battery is doped with heteroatoms to the extent that the molar ratio of lithium to heteroatoms is in the range of from 1:0.01 to 0.10. By maintaining this molar ratio range, even though lithium is excessively oxidized to cause vacancy in the crystal structure, oxygen release can be prevented. On the other hand, since oxygen remains in the crystal structure, the electrical attraction between the transition metal and the oxygen in the active material is strong. Therefore, it is possible to prevent the leakage of the transition metal. In this case, when the content of the heteroatoms is excessively high, the lattice structure may be deformed. Therefore, the high heteroatom content is undesirable. The molar ratio of lithium:heteroatom is preferably in the range of from 1:0.01 to and more the range of from 1:0.01 to 0.05.

The cathode active material for a lithium secondary battery according to the present disclosure has a rhombohedral structure and more specifically a layered structure having an R-3m space. The structure of the cathode active material for a lithium secondary battery according to the present disclosure can be visually identified as in FIG. 9.

The heteroatom is introduced into a tetrahedral site in the lithium layer or the transition metal layer of the rhombohedral structure. Specifically, when B is implanted, since $B^{3+}$ ions have a smaller ionic radius and can be disposed in the tetrahedral sites in the lithium layer or the transition metal layer as described above. This tetrahedral sites are located close to oxygen between the lithium layer and the transition metal layer, the heteroatom disposed in the tetrahedral site attracts the electron of oxygen and prevents the release of oxygen.

In addition, since B is positioned in the tetrahedral site, it is possible to prevent a cation mixing phenomenon in which transition metal cations such as $Ni^{2+}$ move to empty positions in lithium when the battery is charged/discharged. Furthermore, since B has a strong binding energy of 809 kJ/mol with respect to oxygen, it is possible to prevent the problem that the crystal structure can collapse due to the empty sites during charging.

The heteroatom is introduced into an octahedral site to replace a transition metal. Specifically, when Sn is introduced as a dopant, the octahedron sites where transition metal is disposed in the transition metal layer is replaced with Sn.

Sn is present in the form of a tetravalent high value cation that attracts the electrons of oxygen atom towards the transition metal layer. This reduces the repulsive force between the oxygen atoms, thereby preventing the oxygen release phenomenon and reducing the crystal structure stress which causes fine cracking.

In addition, when Sn is introduced as a dopant, the primary particle of the cathode active material may have a bar-like shape. This primary particle has a desired effect on the performance and life of a secondary battery by reducing the energy required for lithium ions to diffuse.

The cathode active material for a lithium secondary battery has lattice parameters of $2.8700<a<2.8800$ and $14.1800<c<14.1900$. In this case, the c/a ratio, which is a lattice parameter ratio, of the cathode active material for a lithium secondary battery is in a range of 4.930 to 4.940. This is because B, which is introduced as a dopant into the cathode active material for a lithium secondary battery, occupies a tetrahedral site, thereby inhibiting the particle growth in the c-axis direction and promoting the particle growth in the a-axis direction.

The cathode active material for a lithium secondary battery is characterized in that the heteroatom is positioned at 3b or 6c of Wyckoff positions. Specifically, among the heteroatoms, Sn is positioned at 3b and B is positioned at 6c. In this case, the atomic coordinates of each of the heteroatoms may be (x, y, z=0, 0, 0.5) for Sn, and (x, y, and z=0, 0, 0.123) for B.

Specifically, a method of preparing the cathode active material for a lithium secondary battery may include: synthesizing a metal oxide precursor; preparing a mixture of the precursor, a dopant, and lithium hydroxide; and heat-treating the mixture and then uniformly grinding the mixture.

The metal oxide precursor is made from a transition metal solution. The transition metal solution contains one or more substrates selected from among a nickel salt, a cobalt salt, and a manganese salt. In this case, the anion of the salt is a commonly used anion, for example, $SO_4^{2-}$, $Cl^-$, and $NO^{3-}$.

The transition metal solution is composed of a salt of a transition metal that is to be included in the chemical composition of the lithium secondary battery cathode active material to be prepared. Preferably it may be a sulfate such as $NiSO_4^{2-}$, $CoSO_4^{2-}$ and $MnSO_4^{2-}$. Preferably, all of $NiSO_4^{2-}$, $CoSO_4^{2-}$, and $MnSO_4^{2-}$ are included.

The molar concentration of the transition metal solution for preparing the metal oxide precursor is in a range of 1.0 M to 5.0 M. When the molar concentration is out of the range described above, the yield of the metal oxide precursor may be low, or the transition metal solution may not be homogeneously mixed. Particularly preferably, the transition metal solution may have a concentration in a range of 2.0 M to 3.0 M.

After the transition metal solution is prepared, an aqueous NaOH solution and ammonia water are added to the transition metal solution to cause co-precipitation. In this way, a metal oxide precursor can be prepared. The co-precipitation method may be performed in a conventionally used co-precipitation reactor. The agitation rate and the reaction temperature may be adjusted according to the molar ratio between the transition metal ions in the transition metal solution. Preferably, the co-precipitation method may be performed in a nitrogen atmosphere or an argon atmosphere that is maintained at atmospheric pressure or a positive pressure of 10 mbar or less.

It is preferred that the co-precipitation is performed for 4 to 12 hours and the pH is maintained between 10.0 and 12.0.

The dopant may include a first dopant, a second dopant, or both. The first dopant is a material including B, for example, $H_3BO_3$. The second dopant may be a material including Sn. Specifically, it may be Sn metal.

In addition, the present disclosure provides a lithium secondary battery cathode including the lithium secondary battery cathode active material and provides a lithium secondary battery including the lithium secondary battery cathode.

The cathode for a lithium secondary battery includes the cathode active material described above, a conductive material, a binder, and a cathode current collector.

The conductive material is used to impart conductivity to the electrode. Therefore, the conductive material is required to have excellent chemical stability and be electronically conductive. Specific examples of the conductive material include carbon-based materials such as graphite, carbon black, Super-P, acetylene black, Ketjen black, channel black, furnace black, lamp black, summer black, carbon fiber, carbon nanotubes, carbon nanowires, graphene, graphite mesocarbon microbeads, fullerene, and amorphous carbon; metal powders or metallic fibers made of copper, nickel, aluminum, and silver; conductive whiskers made of zinc oxide and potassium titanate; conductive metal oxides such as titanium oxide; and conductive polymers such as polyphenylene derivatives. Any one material or a combination of two or more materials selected from the specific examples may be used, but the choice of the conductive material may not be limited thereto.

The binder is an adhesive for bonding the cathode active material, the conductive material, and the cathode collector to each other. Specific examples of the binder include, but are not limited to, polyvinylidene fluoride (PVdF), polyimide (PI), fluoropolyimide (FPI), polyacrylic acid (PAA), polyvinylalcohol (PVA), carboxymethylcellulose (CMC), starch, hydroxypropyl cellulose, regenerated cellulose, polyvinylpyrrolidone (PVP), tetrafluoroethylene (PTFE), polyethylene, polypropylene, polyurethane, ethylene-propylene-diene polymer (EPDM), sulfonated ethylene-propylene-diene polymer (S-EPDM), styrene-butadiene rubber (SBR), fluorine rubber, copolymers thereof, and algin. One or more materials selected the examples as the binder, but the binder is not limited thereto.

The cathode current collector may provide an electrical passage between the cathode active material and a power supply. The cathode current collector may be made of aluminum or aluminum mesh.

The lithium metal battery includes the cathode, an anode, an electrolyte, and a separator.

The anode includes an anode active material and an anode current collector.

The anode active material may be a medium for reducing lithium ions into lithium and storing lithium. The anode active material may be any one selected from the group consisting of: carbon-based materials such as natural graphite, artificial graphite (MCMB, etc.), hard carbon, and soft carbon; silicon-based materials such as silicon, silicon carbon complex, silicon oxide (SiO, $SiO_x$), silicon oxide carbon complex, silica, and silicate; and metal-based materials such as lithium metal, $Li_4Ti_5O_{12}$, and metal oxides (metal is Ti, Cr, Mn, Fe, Co, Ni, Nb, Mo, W, or the like). However, the anode active material is not limited to the examples described above, and any material known to be able to be used as an anode active material can be used without limitation.

Since the binder and the conductive material used for the anode are the same as in the case of the cathode, a redundant description will not be given here.

The current collector for the anode has the same function and configuration as the current collector for the cathode. Specifically, the current collector for the anode may be made of copper.

The anode current collector provides an electrical passage between the anode active material and a power supply. The anode current collector may be made of copper processed into copper clad or copper mesh.

The electrolyte may be a lithium salt, a mixed organic solvent containing a lithium salt, a polymer matrix, or a solid-state electrolyte.

The lithium salt comprises any one or a mixture of two or more selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiC_6H_5SO_3$, LiN $(C_2F_5SO_3)_2$, LiN $(C_2F_5SO_2)_2$, LiN $(CF_3SO_2)_2$, LiN $(FSO_2)_2$, LiN $(C_xF_{2x+1}SO_2)$ $(C_yF_{2y+1}SO_2)$ (herein, x and y are each 0 or a natural number), LiCl, LiI, LiSCN, $LiB(C_2O_4)_2$, $LiF_2BC_2O_4$, $LiPF_4(C_2O_4)$, $LiPF_2(C_2O_4)_2$, and LiP $(C_2O_4)_3$. However, the lithium that can be used is not limited to the examples.

The mixed organic solvent may be any one or a mixture of two or more selected from: a cyclic carbonate group including ethylene carbonate, propylene carbonate, and vinylene carbonate; a fluorinated cyclic carbonate group including fluoroethylene carbonate, difluoroethylene carbonate, and fluoropropylene carbonate; and a linear carbonate group including dimethyl carbonate, methyl ethyl carbonate, and diethyl carbonate. However, the mixed organic solvent is not limited to the examples.

In the electrolyte that is made of a mixed organic solvent containing a lithium salt, the concentration of the electrolyte may be adjusted to a level commonly used in the art. Specifically, for example, the concentration of a lithium salt may be in the range of from 0.1 M to 60 M and more preferably in the range of from 0.5 M to 2 M.

The mixed organic solvent may further include an additive.

The additive plays a role of directly forming or assisting the formation of cathode-electrolyte interface (CEI) or solid-electrolyte interface (SEI), removing active materials such as HF and $PF_5$, preventing overcharging, improving flame retardancy, uniformizing reduction and deposition of lithium. reducing the solvation energy of ions and preventing corrosion of a current collector. Any material previously known for these purposes in the art can be used without limitation.

The content of the additive may be adjusted within the range of from 0.01% to 10% by weight, depending on the desired physical properties.

The electrolyte may include a polymer electrolyte matrix to improve mechanical physical properties or high temperature stability of battery cells. Specifically, the polymer electrolyte matrix may be any one or a mixture of two or more selected from the group consisting of polyacrylate, polymethacrylate, polyvinyledene fluoride (PVDF), polyhexafluoro propylene (PHFP), polyethylene oxide (PEO), polypropylene oxide (PPO), polydimethyl siloxane, polyacrylonitrile, polyvinyl chloride (PVC), PEGDME, and copolymers thereof. Any polymer that is known to have applications related to a lithium secondary battery can be used without limitation.

The polymer matrix may include crosslinking units.

The solid-state electrolyte is a composite of the polymer matrix and the lithium salt. The components of the solid-state electrolyte are the same as the components of the polymer matrix and the lithium salt. Therefore, a duplicate description will be omitted.

For the separator, any form that is commonly known in the art can be used without limitation. Specific examples of the separator include: a porous polyolefin thin film such as polyethylene and polypropylene; a non-woven fabric made of polymeric fibers such as polyacrylate and polyacrylonitrile; and a porous polyolefin thin film coated with a ceramic coating layer.

However, in the case where the electrolyte includes a polymer, has a thin film form, and has physical properties by which the cathode and the anode can be isolated from each other, the separator may not be included.

The lithium secondary battery may be characterized in that the capacity retention rate calculated according to Equation 1 is 85% or more after 100 charge/discharge operations and 80% or more after 150 charge/discharge operations.

Capacity retention rate (%) for n cycles of charging and discharging=(capacity for n-th discharging operation/capacity for first discharging operation)×100 [Equation 1]

Hereinafter, a lithium secondary battery cathode active material and a lithium secondary battery according to the present disclosure will be described with reference to examples. However, the examples described above are presented only for illustrative purposes and are intended to limit the present disclosure. The present disclosure can be embodied in other foiins in addition to the forms presented by the examples. In addition, unless otherwise defined, all technical and scientific terms have the same meaning as that is generally understood by the ordinarily skilled in the art to which the present disclosure pertains. The terms used in the description of the specification of the present application are only intended to effectively describe specific examples and are not intended to limit the present disclosure. Unless otherwise stated herein, the units of the amounts of additives may be % by weight (wt %)

Preparation of Metal Oxide Precursor

A transition metal solution was prepared by weighing $NiSO_46H_2O$, $CoSO_47H2O$, $MnSO_4H_2O$ to be 2.5 M (molar ratio Ni:Co:Mn=0.92:0.03:0.05). The transition metal solution, NaOH solution having a concentration of 4.0 M, and ammonia water having a concentration of 14.8 M were injected into a co-precipitation reactor. The reaction conditions of the co-precipitation reactor were adjusted to 800 rpm and 48 ° C., nitrogen was continuously introduced into the reactor to maintain a nitrogen atmosphere, and the reaction was carried out for a total of 7 hours while maintaining the pH at 11.2. The reaction mixture was filtered to obtain a precipitate using a vacuum filtration device and the residual ions were removed from the precipitate using distilled water to obtain a $Ni_{0.92}Co_{0.03}Mn_{0.05}(OH)_2$ precursor.

EXAMPLE 1 BS-NCM (NCM DOPED WITH B AND SN)

The $Ni_{0.92}Co_{0.03}Mn_{0.05}(OH)_2$ precursor was dried. Next, the precursor, $H_3BO_3$, Sn, and LiOH·H_2O were mixed in the same molar ratio as in Table 1. An electric furnace was preheated to 400° C., and heat treatment was performed at 740° C. in an oxygen atmosphere. The active material after the completion of the reaction was then milled uniformly.

EXAMPLE 2 B-NCM (NCM DOPED WITH B)

All the procedures were performed in the same manner as in Example 1, except for Sn, and the molar ratio was maintained as in Table 1.

EXAMPLE 3 S-NCM (NCM DOPED WITH SN)

All the procedures were performed in the same manner as in Example 1, except for $H_3BO_3$, and the molar ratio was maintained as in Table 1.

Comparative Example P-NCM (Pristine NCM)

All the procedures were performed in the same manner as in Example 1, except for Sn and $H_3BO_3$, and the molar ratio was maintained as in Table 1.

TABLE 1

| Molar ratio | Metal oxide precursor | LiOH•H_2O | Sn | H_3BO_3 |
|---|---|---|---|---|
| Example 1 | 1.0 | 1.02 | 0.01 | 0.01 |
| Example 2 | 1.0 | 1.02 | — | 0.01 |
| Example 3 | 1.0 | 1.02 | 0.01 | — |
| Comparative Example | 1.0 | 1.02 | — | — |

Characterization Method

A. Analysis of Crystal Structure and Surface of Active Material

The crystal structures of the synthesized materials of Examples 1 to 3 and Comparative Example were examined with X-ray diffraction (XRD) and X-ray photoelectron spectroscopy (XPS), and the surface of each active material was examined with scanning electron microscope (SEM) and energy-dispersive spectroscopy (EDS).

Referring to FIGS. 1 and 2, it is noted that the synthesized active material has a layered structure. In the case of Examples 1 to 3 in which the active material is doped, there are no peaks attributed to impurities, and there is no secondary phase. It is found that all the active materials were synthesized to have a layered structure of R-3m space group (JCPDS No. 85-1968).

TABLE 2

| | a (Å) | c (Å) | V (Å³) | c/a | Ni²⁺ ratio | R_{wp} (%) |
|---|---|---|---|---|---|---|
| Example 1 | 2.874 | 14.1842 | 101.462 | 4.9354 | 6.10% | 4.34 |
| Comparative Example | 2.8675 | 14.1788 | 100.969 | 4.9447 | 1.50% | 5.1 |

Referring to Table 2, the values of the crystallographic parameters of Example 1 and Comparative Example, calculated on the basis of the XRD data, can be confirmed. In this case, the term "Ni²⁺ ratio" refers to a molar fraction of divalent ions with respect to all Ni ions.

In the case of Comparative Example, the peaks are clearly distinguished from each other. However, in the case of Examples 1 to 3, the peak separation is reduced, and it is inferred that dopant ions reduce the Li-O-TM arrangement.

In addition, since an Li2SnO3 peak attributed to the implantation of Sn is not formed, it is noted that an impurity phase is not formed.

FIG. 3 shows a particle diameter distribution of the $Ni_{0.92}Co_{0.03}Mn_{0.05}(OH)_2$ precursor in which the median diameter dso is 11.48 μm.

FIG. 4 shows the surface and morphology of the $Ni_{0.92}Co_{0.03}Mn_{0.05}(OH)_2$ precursor. The precursor is composed of primary particles having a thin plate form, and the primary particles aggregate to form a spherical secondary particle.

Referring to FIG. 5, it is seen that the particles of Example 1 have a bar shape and a very smooth surface. In the case of Example 2, the size and shape of the particles are first similar to those of the particles of Comparative Example. It is noted that the shape of the particles has changed due to boron doping. In the case of Example 3, the size or shape of the particles is similar to the that of the particles of Comparative Example, but the surface is softened due to tin doping. The particles of Comparative Example have a non-smooth surface and appear to be molten.

Referring to FIG. 6, the distribution of each element in the particles of Example 1 can be visually identified. As a result of examining the ratio of each element using an EDS spectrum, the particles of Example 1 exhibited Ni>0.9, and Co, Mn, and Sn were all detected in small amounts. Referring to FIG. 7, the distribution of each of the elements can be recognized in more detail.

Referring to FIG. 8, the binding energy between Example 1 and Comparative Example can be compared. The $2p_{3/2}$ binding energy of Example 1 is 855.1 eV, and the 2p3/2 binding energy of Comparative Example is 855.2 eV. There is no significant difference in the binding energy. In the case of Example 1, the binding energy of B and Sn is generated, and B and Sn are involved in the crystal structure.

FIG. 9 is a schematic diagram of an R-3m structure in which a layered structure in which octahedrons are stacked is formed. $B^{3+}$ has a small size and is positioned in an intrusive position. $B^{3+}$ is positioned in a tetrahedron in a lithium layer or a tetrahedron in a transition metal. Most doping elements enter transition metal ion sites, but elements such as boron (B) enter intrusive positions, thereby capturing oxygen with strong binding energy.

$Ni^{2+}$ ions that can occur during charging/discharging of a battery are similar in size to $LNi^+$ ions. For this reason, when the battery is charged or discharged, cationic mixing occurs in which $Ni^{2+}$ ions move to empty sites in lithium. However, since boron is positioned in an intrusive position, the boron acts as an obstacle to such movement, thereby reducing the occurrence of cationic mixing.

In addition, $Sn^{4+}$ ions are substituent dopants to occupy the sites of metal ions. In addition, $Sn^{4+}$ ions are inert during charging and discharging and have a strong binding force with oxygen, thereby maintaining a more stable crystal structure. Particularly, in a cathode containing a high content of nickel, the electron density is increased in the direction of the transition metal layer, thereby reducing the repulsive force between the oxygen atoms. Due to this characteristic, the risk of structural collapse due to the c-axis lattice constant reduction of the active material occurring at 4.2 V can be mitigated, and the anisotropic lattice stress can be reduced. Therefore, it is possible to improve the problem of lattice structure of NCM electrode containing a light concentration of nickel.

B. Assessment of Electrochemical Performance

Denka black was used as a conductive material and polyvinylidene difluoride (PVDF) was used as a binder. A slurry was prepared by mixing a cathode material, the conductive material, and the binder in a weight ratio of 8:1:1.

The slurry was applied to an aluminum foil and vacuum-dried for 24 hours in an oven maintaining 120° C. to produce a cathode.

The cathodes manufactured using the materials of Examples 1 to 3, and lithium chips were used to manufacture 2032 coin cells in a glove box having oxygen and moisture removed. In this case, $LiPF_6$ was dissolved to have a concentration of 1.0 M in an organic solution in which ethylene carbonate(EC), dimethyl carbonate (DMC), and ethylmethyl carbonate (EMC) were mixed in a volume ratio of 1:1:1. A separator was made of a porous polypropylene membrane having a thickness of 15 μm.

The prepared cells were charged and discharged at 20 mA/g cc by 2 cycles and then charged and discharged at 200 mA/g cc by 150 cycles.

FIG. 10 shows a charging/discharging profile of each cell. Comparative Example shows that the capacity tends to rapidly decrease, which is due to problems such as electrolyte side reactions on the surface, crystalline structure collapse due to rapid volume changes, oxygen release, inert $Ni^{4+}$ generation, cation mixing, and transition metal elution.

On the other hand, Examples 1 to 3 show that the initial capacity thereof is slightly lower than that of Comparative Example, but the tendency of the capacity decrease is less.

FIG. 3 shows the tendency of the capacity decrease in more detail.

TABLE 3

| | Specific capacity (mAh/g) | | | | | Capacity retention (%) | |
|---|---|---|---|---|---|---|---|
| | $1^{st}$ | $10^{th}$ | $50^{th}$ | $100^{th}$ | $150^{th}$ | $100^{th}$ | $150^{th}$ |
| Example 1 | 200.0 | 173.2 | 163.6 | 157.7 | 151.0 | 91.1 | 86.9 |
| Example 2 | 200.3 | 182.3 | 173.5 | 157.5 | 146.8 | 88.9 | 82.9 |
| Example 3 | 200.1 | 193.0 | 187.2 | 167.0 | 143.6 | 90.9 | 78.2 |
| Comparative Example | 205.1 | 185.9 | 171.2 | 153.4 | 136.4 | 82.4 | 73.3 |

Capacity retention rate (%) = Capacity retention rate (%) for n cycles of charging and discharging = (capacity for n-th discharging operation/capacity for first discharging operation) × 100

That is, although the initial capacity of Comparative Example is high, the capacity retention rate is 82.4% for the $100^{th}$ discharging and 73.3% for the 150th discharging. In the case of Examples 1 to 3, the capacity retention rate is 85% or more for the $100^{th}$ discharging and 75% or more for the $150^{th}$ discharging.

Referring to FIG. 11, a change in charging/discharging profile and a change in specific capacity according to the number of charging/discharging cycles for Comparative Example and Example 1 can be recognized. Comparative examples and Example 1 show that the initial capacity is similar. However, Example 1 exhibits the better capacity retention when the number of cycles increases than Comparative Example and exhibits a higher capacity than Comparative Example even when a rate is increased.

The dQ/dV graph of FIG. 12 illustrates the structural change of NCM when lithium ions are intercalated and deintercalated during charging and discharging and illustrates the degree of polarization of an electrode after a charging/discharging cycle is performed. In the case of Comparative Example, phase changes occur with three oxidation/reduction peaks during charging/discharging. First, a phase change occurs from the hexagonal layered structure H1 to the monoclinic phase M and then to two other hexagonal phases H2 and H3. Mechanical stresses arise due to the fast contraction in the c-axis direction within the crystal structure, especially when a phase change from H2 to H3 occurs. In the case of Comparative Example, the formation of microcracks on the active material surface, the penetration of electrolyte into particles, the generation of inert Ni 4 +, and the instability of crystal structures due to oxygen release occur, resulting in decrease in the capacity.

In the dQ/dV graph shown in FIG. 12, the peak intensity was highest at about 3.6-3.7 V in the third cycle, and was significantly reduced after 150 cycles. In addition, after 150 cycles, the peak of the phase change from H1 to M shifted by +0.04 V due to the polarization.

In addition, after 150 cycles, the redox peaks shifted by −0.01 V, +0.08 V, and +0.07 V, occurred respectively. In Examples 1 and 3 in which tin was added, high polarization and a large overvoltage occurred after 3 cycles. The shift attributed to the polarization in Example 1 was similar to the sum of the shift in Example 2 and the shift in Example 3.

For Examples 1 and 3, the reduction in phase change peak from H1 to M even after 150 cycles was significantly smaller than that in Comparative Example. This is because the long bar-shaped primary particle, obtained due to boron, affects the diffusion of lithium ions, and the lithium ions can be more easily intercalated/deintercalated even after the number of cycles is significantly large. In addition, in the case of Examples 1 and 2, at 150 cycles, the peak of the phase change from H2 to H3 upon discharging shifted, but the peak intensity was hardly reduced. In the case of boron-added NCM, the irreversible H2-H3 phase change was maintained for a considerable time, which was consistent with the improved cycle characteristics, and the effect of boron doping was recognized.

FIG. 13 is a Nyquist plot illustrating the impedance measured in each of Comparative Example and Example 1, at room temperature in a frequency band of 100 kHz to 10 mHz. The circuit model consists of circuit resistance (Rs), constant phase elements (CPE1, CPE2), surface film resistance (Rf), charge transfer resistance (Rct), and Warburg coefficient (W), and the calculated values of each parameter are shown in Table 4.

TABLE 4

|  | $R_s$ | $R_f$ | $R_{ct}$ | $D_{Li+}$ (cm² s⁻¹) |
|---|---|---|---|---|
| Example 1 | 3.06 | 14.54 | 606.529 | $5.72 \times 10^{-10}$ |
| Comparative Example | 3.16 | 25.79 | 616.39 | $1.22 \times 10^{-10}$ |

In Table 3, the difference in bulk resistance $R_s$ between Comparative Example and Example 1 was little, but the surface interface resistance $R_f$ pf Comparative Example was 2 times higher than that of Example 1. The result is attributed that the dopants B and Sn located on the surface of Example 1 are highly conductive and have reduced interfacial resistance. In addition, the electron transition resistance Rt of Example 1 was lower than that of Comparative Example, and the primary particles changed to have a bar shape due to boron doping promoted the lithium ion movement. As a result, the lithium ion diffusion coefficient $D_{Li+}$ of Example 1 was higher.

The lithium ion diffusion coefficient $D_{Li+}$ is calculated according to the following equation.

$$D_{Li+}=R^2T^2/2n^4F^4A^2C^2\sigma^2 \quad \text{[Equation]}$$

Here R is the gas constant, T is the absolute temperature, n is the number of electrons participating in the reaction, F is the Faraday constant, A is the area of the cathode, C is the concentration of lithium ions in the material, and σ is the Warburg coefficient associated with the real part Z' of the impedance.

As a result of calculating the lithium ion diffusion coefficient D $_{(Li+)}$, the diffusion coefficient of Example 1 was $5.72\times10^{-10}$cm²s⁻¹, resulting in a diffusion rate higher than a diffusion rate of $1.22\times10^{-10}$cm²s⁻¹ of Comparative Example. That is, as described above, the tin doping improved conductivity, and boron doping changed the shape of the primary particles so that the movement of electrons and lithium ions was accelerated and that the diffusion rate was high.

FIG. 14 shows SEM images of electrodes of Example 1 and Comparative Example after 150 cycles. In this case, the electrodes of Example 1 and Comparative Electrode show an obscure morphology covered with a material presumed to be a mixture of a carbon compound, PVdF, electrolyte, and CEI. It was difficult to find an isometric primary particle in the electrode of Comparative Example, but the primary particles having a long bar shape similar to the initial one was identified.

FIG. 15 shows the results of in-situ XRD measurements performed during charging and discharging, to directly observe changes in the crystal structure of a cathode active material during charging and discharging. It was noted that the peak denoted by (003) shifts to a smaller angle during the initial charging, and that a phase change to H2 and H3 occurs at a voltage higher than 4V, causing 2θ to move back to a larger angle, and that the peak returns in the opposition direction during discharging. That is, the change is a reversible change.

Referring to FIG. 16, a change in the a-axis and a change in the c axis during a charging operation are shown. On the other hand, the c-axis increased more significantly compared to the a-axis during phase changes of H1-M-H2. This is because as the lithium ions are deintercalated, the gap between the (003) planes is increased due to the repulsive force between the oxygen atoms as shown in FIG. 2. However, as lithium exits excessively, the lithium layer collapses, and the atomic rearrangement to the O1 structure occurs, resulting in a rapid decrease in the c-axis length. That is, the changes in the lattice parameters between Example and Comparative Examples were similar, but the electrode of Example exhibited a larger change in the c-axis length than the electrode of Comparative Example. In this case, the increase in the c-axis was 0.19 Å until changing to the H2 structure in Example and 0.21 Å in Comparative Example. The lattice contraction after the change to the H2 structure was 0.62 Å in Example and 0.58 Å in Comparative Example. This indicates that by suppressing the repulsive force between the oxygen atoms and inhibiting the oxygen release by using the strong binding energy of the doped heteroatoms, the increase in the c-axis and the decrease in the c-axis after the change to the H2 structure have been reduced.

Referring to FIG. 17, it is seen that there is no impurity peak among the NCM peaks of Comparative Example and Example 1, and no secondary phase is foamed. However, in the case of Comparative Example, it is seen that a shoulder peak is formed due to the crystal destruction of the (003) plane, no such structural change occurs.

Referring to FIG. 18, in the case of Example 1, it is noted that B and Sn are still present after the charging/discharging cycles and do not depart from the doped positions.

TABLE 5

|  |  | Ni$^{2+}$ ratio (%) | Ni$^{3+}$ ratio (%) |
|---|---|---|---|
| Before cycles | Example 1 | 26 | 74 |
|  | Comparative Example | 30 | 70 |
| After cycles | Example 1 | 45 | 55 |
|  | Comparative Example | 57 | 43 |

Referring to Table 5, the change in the fraction of Ni ions before and after the charging/discharging cycle is shown. Ni$^{2+}$ forms a nickel oxide (Ni—O) in the charging/discharging process. The structure is a stable rock salt structure but is electrochemically almost in a passive state, thereby causing a capacity reduction. That is, the Ni$^{3+}$ ratio of Example 1 is maintained higher than that of Comparative Example 1, and thus the formation of nickel oxides is inhibited.

The present disclosure has been described with reference to some specific examples and characters. However, the specific examples and characteristics are only for illustrative purposes and are intended to limit the scope of the present disclosure, and it will be appreciated that various modifications and changes are possible from the above description by those skilled in the art to which the present disclosure pertains.

Therefore, the spirit of the present disclosure is not limited to the specific examples described above, and all forms defined by the appended claims and all equivalents and modifications thereto fall within the scope of the present disclosure.

What is claimed is:

1. A rhombohedral structured cathode active material for a lithium secondary battery, the cathode active material comprising nickel, cobalt, and manganese, and being doped with a heteroatom, wherein the cathode active material has a chemical formula of Li(Ni$_x$Co$_y$Mn$_{1-x-y}$)O$_2$, wherein x is in a range of 0.40≤x≤0.96, and y is in a range of 0.01≤y≤0.30, and x+y<1 when the heteroatom is excluded, wherein the heteroatom is at least one selected from among B and Sn, and wherein the heteroatom is incorporated into the rhombohedral structure at a Wyckoff position selected from among 3b and 6c.

2. The cathode active material of claim 1, wherein a molar ratio of the lithium to the heteroatom is in a range of from 1:0.01 to 0.10.

3. The cathode active material of claim 1, wherein lattice parameters of the cathode active material satisfy 2.8700<a<2.8800 and 14.1800<c<14.1900.

4. The cathode active material of claim 1, wherein the lattice parameters of the cathode active material have values that make a c/a value fall within a range of 4.930 to 4.940.

5. The cathode active material of claim 1, comprising lithium layers and transition metal layers alternately stacked.

6. The cathode active material of claim 5, wherein the heteroatom is positioned in a tetrahedron site in the lithium layer or a tetrahedron site in the transition metal layer.

7. The cathode active material of claim 6, wherein the heteroatom is positioned to replace an octahedron site of a transition metal in the transition metal layer.

8. A lithium secondary battery cathode comprising the cathode active material of claim 1.

9. A lithium secondary battery comprising the cathode active material of claim 1.

10. The lithium secondary battery of claim 9, wherein the lithium secondary battery has a capacity retention rate of 80% or more calculated according to Equation 1 after 150 cycles of charging and discharging operations Capacity retention rate (%) for n cycles of charging and discharging=(capacity for n-th discharging operation/capacity for first discharging operation)×100.　　[Equation 1]

* * * * *